United States Patent
Yu et al.

(10) Patent No.: US 6,818,154 B2
(45) Date of Patent: Nov. 16, 2004

(54) LOW-VOLTAGE EXCITED RED PHOSPHOR AND METHOD OF PREPARING THE SAME

(75) Inventors: Il Yu, Suwon (KR); Young-Chul You, Suwon (JP); Kyu-Chan Park, Suwon (KR)

(73) Assignee: Samsung SDI Co., Ltd., Suwon-si (KR)

( * ) Notice: Subject to any disclaimer, the term of this patent is extended or adjusted under 35 U.S.C. 154(b) by 27 days.

(21) Appl. No.: 10/060,394

(22) Filed: Feb. 1, 2002

(65) Prior Publication Data

US 2002/0153826 A1 Oct. 24, 2002

(30) Foreign Application Priority Data

Feb. 7, 2001 (KR) .......................................... 2001-5955

(51) Int. Cl.$^7$ .......................... C09K 11/67; C09K 11/55
(52) U.S. Cl. ................................................. 252/301.4 F
(58) Field of Search ................................... 252/301.4 F

(56) References Cited

U.S. PATENT DOCUMENTS

| | | |
|---|---|---|
| 5,619,098 A | 4/1997 | Toki et al. |
| 6,440,329 B1 * | 8/2002 | Gwak et al. .......... 252/301.4 F |

* cited by examiner

Primary Examiner—C. Melissa Koslow
(74) Attorney, Agent, or Firm—Staas & Halsey LLP

(57) ABSTRACT

A low-voltage excited red phosphor of the present invention has a matrix including an oxide of an alkaline earth metal and titanium and doping elements including a rare-earth element, a group 13 element, and Zn. The phosphor has an improved lifetime and high brightness.

2 Claims, 3 Drawing Sheets

LOW-VOLTAGE EXCITED RED PHOSPHOR AND METHOD OF PREPARING THE SAME

CROSS-REFERENCE TO RELATED APPLICATIONS

This application is based on Korean patent application No. 2001-5955, filed on Feb. 7, 2001, the content of which is incorporated herein by reference.

BACKGROUND OF THE INVENTION

1. Field of the Invention

The present invention relates to a low-voltage excited red phosphor and a method of preparing the same, and more particularly, to a low-voltage excited red phosphor having a long lifetime for a Field Emission Display (FED) or a Vacuum Fluorescent Display (VFD), and a method of preparing the same.

2. Description of the Related Art

Low-voltage driving displays at 1 kV or less mainly include Field Emission Displays (FED), Vacuum Fluorescent Displays (VFD), etc. The Field Emission Display is actively being studied as a next generation small-sized Flat Panel Display (FPD) device, and the Vacuum Fluorescent Display (VFD) is mainly being used for a variety of display devices for household electric appliances, audio and video (AV) equipment, automobiles, etc. These low-voltage displays are constructed so that electrons emitted from an electron emitter, such as a heating wire, irradiate phosphors resulting in the production of desired images.

Phosphors for low-voltage driving devices, such as Field Emission Displays, Vacuum Fluorescent Displays, etc., should have low electrical resistance, low luminescence initiating voltages, high luminescence efficiency at low voltage, no brightness saturation, minimal defects on the phosphor particle surface, stable luminescence conditions when excited by low-velocity electrons, and they should not undergo decomposition.

Currently, a sulfide-based phosphor is widely used as a phosphor for a low-voltage driving device. As the host materials of sulfide-based phosphors have high resistance, conductive materials are added to these phosphors so that they can be used in low-velocity electron-beam excitation applications. However, non-sulfide based phosphors are actively being developed as there are problems of cathode filament contamination and phosphor efficiency deterioration due to sulfide-based gas emission and phosphor decomposition-scattering during electron-beam excitation. Additionally (ZnCd)S is an environmental contaminant.

$SnO_2$:Eu, $Y_2O_3$:Eu, etc., are widely used red phosphors for low-voltage driving display devices, such as vacuum fluorescent display devices, field emission display devices, or the like. However, $SnO_2$:Eu has low brightness, and $Y_2O_3$:Eu has a high driving voltage of more than 80V and insufficient conductivity so that a large amount of $In_2O_3$ as a conductive material is added, resulting in deterioration of the luminescence of the phosphor.

U.S. Pat. No. 5,619,098 discloses the red phosphor $SrTiO_3$:Pr,Al that has an unsatisfactory improvement degree of phosphor lifetime, with a brightness maintenance level of merely 40% over 1000 hours relative to initial brightness. Therefore, a phosphor with a long lifetime is still required in the industry.

SUMMARY OF THE INVENTION

Accordingly, it is an object of the present invention to provide a low-voltage excited red phosphor having a long lifetime and a non-deteriorating high brightness.

It is another object of the present invention to provide a low-voltage excited oxide-based red phosphor having no problems of cathode filament contamination and environmental contamination.

It is yet another object of the present invention to provide a method of preparing the low-voltage excited red phosphor having the properties as above.

Additional objects and advantages of the invention will be set forth in part in the description which follows and, in part, will be obvious from the description, or may be learned by practice of the invention.

The foregoing and other objects of the present invention are achieved by providing a low-voltage excited red phosphor comprising a matrix including an oxide of an alkaline earth metal and titanium and doping elements including a rare-earth element, a group 13 element, and Zn.

The foregoing and other objects of the present invention may also be achieved by providing a method of preparing the low-voltage excited red phosphor comprising mixing a salt of an alkaline earth metal and titanium oxide to obtain a mixture; adding a rare-earth element-containing compound, a group 13 element-containing compound, and Zn-containing compound to the mixture; and firing the mixture at a temperature in the range of 1100–1400° C.

BRIEF DESCRIPTION OF THE DRAWINGS

These and other objects and advantages of the present invention will become apparent and more readily appreciated from the following description of the embodiments, taken in conjunction with the accompanying drawings of which.

DETAILED DESCRIPTION OF THE PREFERRED EMBODIMENTS

Figure 1:
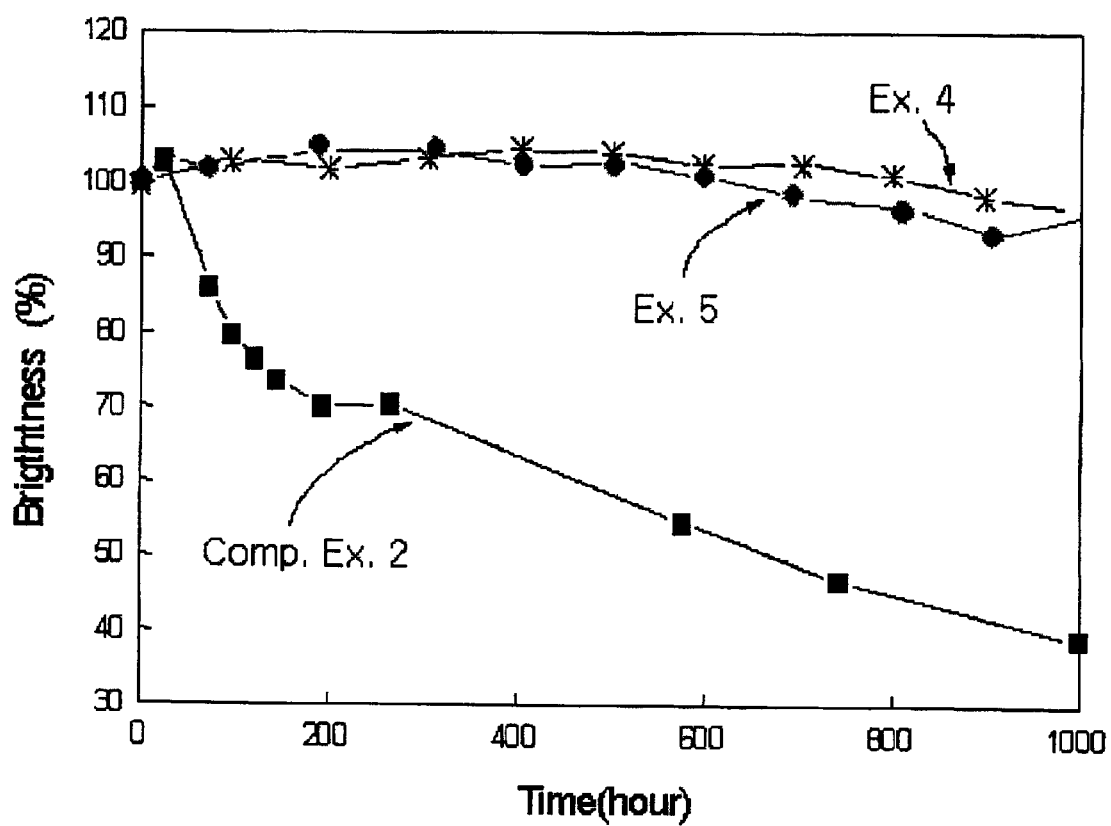
FIG. 1 illustrates brightness of the phosphor according to Examples of the present invention and the Comparative Example with respect to a lapse of time.

Reference will now be made in detail to the embodiments of the present invention, examples of which are illustrated in the accompanying drawings, wherein like reference numerals refer to the like elements throughout. The embodiments are described below in order to explain the present invention by referring to the figures.

The low-voltage excited red phosphor according to an embodiment of the present invention comprises a matrix including an oxide of an alkaline earth metal and titanium and doping elements including a rare-earth element, a group 13 element, and Zn. The phosphor has the following composition formula:

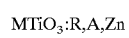

$MTiO_3$:R,A,Zn wherein M is an alkaline earth metal, and preferably at least one metal selected from the group consisting of Mg, Sr, Ca, Ba, or a combination thereof; R is a rare-earth element, and preferably at least one element selected from the group consisting of Ce, Eu, Tb, Er, Tm, Pr, Dy, Gd, or a combination thereof; and A is a group 13 element, preferably at least one element selected from the group consisting of Al, Ga, In, Tl, or a combination thereof, and more preferably Al or Ga.

The matrix $MTiO_3$ has a perovskite structure. The group 13 element (according to the new IUPAC agreement) refers to the element group including Al of the Periodic Table.

A doping amount of the rare-earth element is 0.05 to 5 mol %, preferably 0.1 to 0.3 mol % of the phosphor; a doping amount of the group 13 element is more than 0 mol % and less than or equal to 130 mol %, preferably 0.05 to 80 mol % of the phosphor; and a doping amount of Zn is more than 0 mol % and less than 100 mol %, preferably 0.05 to 20 mol %, and more preferably 0.05 to 10 mol % of the phosphor.

The phosphor may include more than two kinds of the rare-earth element as doping elements as is the case with the group 13 element and Zn. For example, the phosphor according to the Examples of the present invention has a composition of $SrTiO_3$:Pr,Al,Ga,Zn. A doping amount of Pr is 0.05 to 5 mol %, preferably 0.1 to 0.3 mol % of the phosphor; a doping amount of Al is 0 to 130 mol % of the phosphor, a doping amount of Ga is 0 to 100 mol % of the phosphor, wherein the sum of the doping amount of Al and Ga is 0.05 to 130 mol % of the phosphor; and a doping amount of Zn is 0.05 to 20 mol % of the phosphor.

For preparation of the low-voltage excited red phosphor, a salt of an alkaline earth metal and titanium oxide are mixed to obtain a mixture. The salt of the alkaline earth metal and the titanium oxide are mixed in a mole ratio of 0.7–1:1. When the mole ratio is within the above range, brightness of the phosphor is not deteriorated. Examples of alkaline earth metal salts used in the present invention include carbonate or nitrate.

The rare-earth element-containing compound, a group 13 element-containing compound and a Zn-containing salt are added to the resultant mixture. Examples of the rare-earth element-containing compound and group 13 element-containing compound used in the present invention include halide, hydroxide, and oxide, and an example of a Zn-containing compound used in the present invention includes a salt. Examples of Zn-containing compounds include ZnO, ZnBr, $ZnCl_2$, $Zn(NO_3)_2$, $Zn(NO_3)_2 \cdot 6H_2O$, $Zn(PO_4)_2$, $ZnSO_4$, $Zn(OH)_2$, etc.

The resultant mixture is subjected to firing at a temperature in the range of 1100–1400° C., preferably 1200–1300° C. The firing operation is subject to being carried out for about 1–6 hours, preferably 2–6 hours and can be performed under a reducing atmosphere or an air atmosphere. During this firing operation, the crystallinity of the $MTiO_3$ matrix is improved. The fired resulting material can be subjected to sieving to produce a phosphor.

In order to more fully illustrate the embodiments of the present invention, the following detailed examples are given.

EXAMPLE 1

$SrCO_3$ and $TiO_2$ were mixed at a mole ratio of 1:1, the mixture was well mixed in an alumina crucible after adding 0.2 mol % of $PrCl_3$, 23 mol % of $Al(OH)_3$, and 1 mol % of ZnO, and fired for 3 hours at 1300° C. to produce the red phosphor $SrTiO_3$:Pr,Al,Zn of the present invention.

EXAMPLE 2

A red phosphor, $SrTiO_3$:Pr,Al,Zn, was prepared by the same method as in Example 1, except that 5 mol % of ZnO was used.

EXAMPLE 3

A red phosphor, $SrTiO_3$:Pr,Al,Zn, was prepared by the same method as in Example 1, except that 6 mol % of $ZnSO_4$ was used.

EXAMPLE 4

$SrCO_3$ and $TiO_2$ were mixed at a mole ratio of 1:1, the mixture was well mixed in an alumina crucible after adding 0.2 mol % of $PrCl_3$, 5.76 mol % of $Al(OH)_3$, 6 mol % of $GaO_3$, and 3.36 mol % of $Zn(NO_3)_2 \cdot 6H_2O$, and fired for 6 hours at 1300° C. to produce the red phosphor $SrTiO_3$:Pr, Al,Ga,Zn of the present invention.

EXAMPLE 5

$SrCO_3$ and $TiO_2$ were mixed at a mole ratio of 1:1, the mixture was well mixed in an alumina crucible after adding 0.2 mol % of $PrCl_3$, 23 mol % of $Al(OH)_3$, 6 mol % of $GaO_3$, and 3.36 mol % of $Zn(NO_3)_2 \cdot 6H_2O$, and fired for 6 hours at 1300° C. to produce the red phosphor $SrTiO_3$:Pr,Al,Ga,Zn of the present invention.

EXAMPLE 6

A red phosphor, $SrTiO_3$:Pr,Al,Ga,Zn, was prepared by the same method as in Example 5, except that 0.2 mol % of $PrCl_3$, 23 mol % of $Al(OH)_3$, 1.5 mol % of $GaO_3$, and 3.36 mol % of $Zn(NO_3)_2 \cdot 6H_2O$ were added.

EXAMPLE 7

A red phosphor, $SrTiO_3$:Pr,Al,Ga,Zn, was prepared by the same method as in Example 5, except that 0.2 mol % of $PrCl_3$, 23 mol % of $Al(OH)_3$, 24 mol % of $GaO_3$, and 3.36 mol % of $Zn(NO_3)_2 \cdot 6H_2O$ were added.

EXAMPLE 8

A red phosphor, $SrTiO_3$:Pr,Al,Ga,Zn, was prepared by the same method as in Example 5, except that 0.2 mol % of $PrCl_3$, 23 mol % of $Al(OH)_3$, 6 mol % of $GaO_3$, and 1.68 mol % of $Zn(NO_3)_2 \cdot 6H_2O$ were added.

EXAMPLE 9

A red phosphor, $SrTiO_3$:Pr,Al,Ga,Zn, was prepared by the same method as in Example 5, except that 0.2 mol % of $PrCl_3$, 23 mol % of $Al(OH)_3$, 6 mol % of $GaO_3$, and 5.04 mol % of $Zn(NO_3)_2 \cdot 6H_2O$ were added.

Comparative Example 1

A red phosphor, $SrTiO_3$:Pr,Al, was prepared by the same method as in Example 1, except that ZnO was not added.

Comparative Example 2

A red phosphor, $SrTiO_3$:Pr,Al, was prepared by the same method as in Example 5, except that $Zn(NO_3)_2 \cdot 6H_2O$ was not added, which produced the same phosphor as in U.S. Pat. No. 5,619,098.

Vacuum fluorescent display devices were manufactured using the phosphors of Examples 1 to 5 and Comparative Example 1 and 2. The CIE color coordinates, initial relative brightness on the basis of Comparative Example 1, and brightness maintenance over 1000 hours of each phosphor were measured while driving the vacuum fluorescent display devices at a 35V driving voltage, and the results are shown in Table 1.

TABLE 1

|  | Color coordinates | Initial relative brightness (%) | Brightness maintenance over 1000 hours (%) |
| --- | --- | --- | --- |
| Example 1 | x = 0.665<br>y = 0.332 | 80% | 70% |
| Example 2 | x = 0.666<br>y = 0.332 | 80% | 90% |
| Example 3 | x = 0.666<br>y = 0.333 | 102% | 68% |
| Example 4 | x = 0.666<br>y = 0.333 | 90% | 97% |
| Example 5 | x = 0.666<br>y = 0.333 | 100% | 96% |
| Comparative Example 1 | x = 0.666<br>y = 0.333 | 100% | 30% |
| Comparative Example 2 | x = 0.666<br>y = 0.333 | 90% | 39% |

As shown in Table 1, the CIE color coordinates of the red phosphor according to Examples 1 to 5 and Comparative Examples 1 and 2 indicate that the phosphor emitted red light. The red phosphors according to Examples 1 to 5 have a luminescence initiating voltage of less than 100V, and thus are applied as low-voltage phosphors.

FIG. 1 shows brightness of the red phosphor according to Examples 4 and 5 of the present invention and Comparative Example 2 with respect to a lapse of time. As shown in Table 1 and FIG. 1, the brightness of the red phosphors according to Examples 1 to 5 is excellently maintained over 1000 hours. On the contrary, the brightness of the red phosphors according to Comparative Example 2 was steeply reduced after about 60 hours. That is to say, the red phosphors doped with Zn according to Examples 1 to 5 have more improved lifetimes than that of the red phosphor without Zn doping element according to Comparative Example 2.

Figure 2:
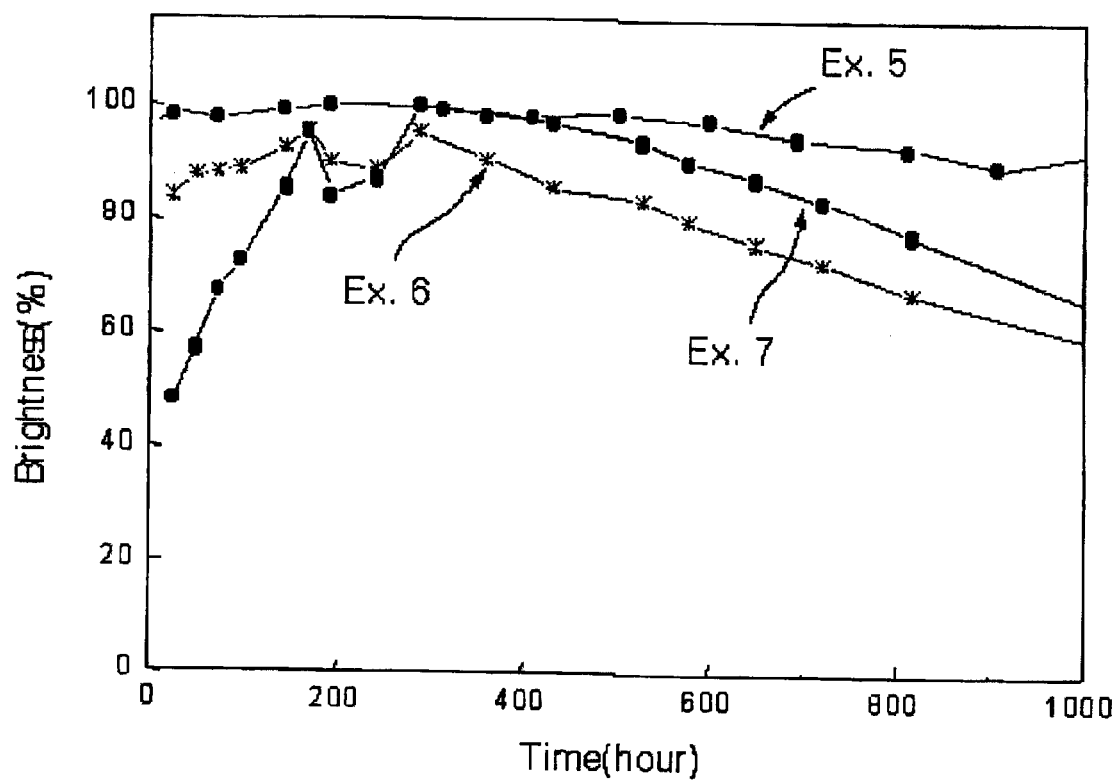
FIG. 2 illustrates brightness of the phosphor $SrTiO_3$:Pr, Al,Ga,Zn according to Examples of the present invention, varying the doping amount of the Ga element and with respect to a lapse of time.
Figure 3:
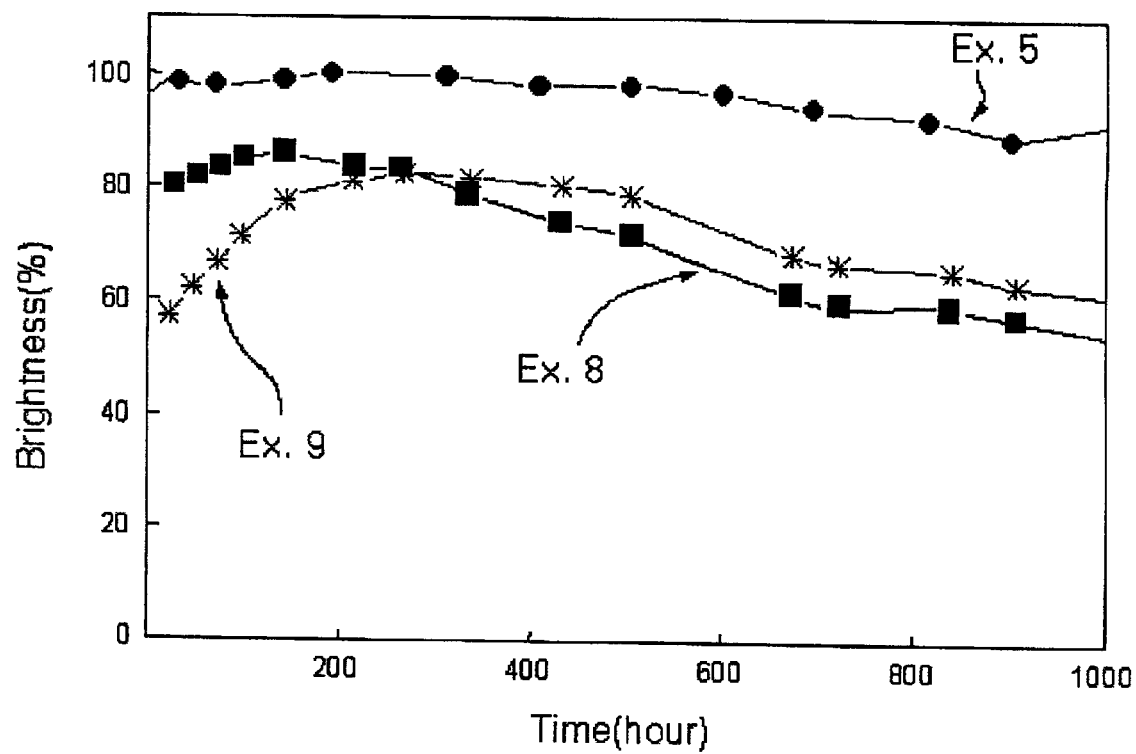
FIG. 3 illustrates brightness of the phosphor $SrTiO_3$:Pr, Al,Ga,Zn according to Examples of the present invention, varying the doping amount of the Zn element and with respect to a lapse of time.

FIG. 2 shows brightness of the red phosphor $SrTiO_3$:Pr,Al,Ga,Zn according to Examples 5 to 7, varying the doping amount of the Ga element and with respect to a lapse of time. FIG. 3 shows brightness of the red phosphor $SrTiO_3$:Pr,Al,Ga,Zn according to Examples 5, 8, and 9, varying the doping amount of the Zn element and with respect to a lapse of time. As shown in FIGS. 2 and 3, the red phosphor $SrTiO_3$:Pr,Al,Ga,Zn according to Examples 5 to 9 have an improved brightness of more than 60% based on initial brightness.

As described above, the red phosphor of the present invention has an enhanced lifetime because of doping elements including a rare-earth element, a group 13 element, and Zn in a matrix including an oxide of an alkaline earth metal and titanium.

Although a few embodiments of the present invention have been shown and described, it will be appreciated by those skilled in the art that changes may be made in these embodiments without departing from the principles and spirit of the invention, the scope of which is defined in the appended claims and their equivalents.

What is claimed is:

1. A method of preparing the low-voltage excited red phosphor comprising:

mixing a salt of an alkaline earth metal and titanium oxide to obtain a mixture;

adding a rare-earth element-containing compound, a group 13 element-containing compound and a Zn-containing compound to the mixture; and firing the mixture at a temperature in a range of 1100–1400° C.

2. The method according to claim 1, wherein the Zn-containing compound is at least one Zn-containing salt selected from the group consisting of ZnO, ZnBr, $ZnCl_2$, $Zn(NO_3)_2$, $Zn(NO_3)_2 6H_2O$, $Zn(PO_4)_2$, $ZnSO_4$, and $Zn(OH)_2$.

\* \* \* \* \*